Dec. 31, 1963 C. H. NOWLIN 3,116,460

FREQUENCY SELECTIVE AMPLIFIER METHODS AND CIRCUITS

Filed Sept. 27, 1960 3 Sheets-Sheet 1

CHARLES H. NOWLIN
INVENTOR

BY Samuel L. Davidson
ATTORNEY

INVENTOR.
CHARLES H NOWLIN
BY Samuel L Davidson

Dec. 31, 1963 C. H. NOWLIN 3,116,460

FREQUENCY SELECTIVE AMPLIFIER METHODS AND CIRCUITS

Filed Sept. 27, 1960 3 Sheets-Sheet 3

CHARLES H. NOWLIN
INVENTOR

BY Samuel L. Davidson

ATTORNEY

United States Patent Office 3,116,460

Patented Dec. 31, 1963

3,116,460

FREQUENCY SELECTIVE AMPLIFIER METHODS AND CIRCUITS

Charles H. Nowlin, Cambridge, Mass.
(117 Melvern Road, Oak Ridge, Tenn.)

Filed Sept. 27, 1960, Ser. No. 58,688
2 Claims. (Cl. 330—94)

This invention relates to frequency selective amplifier systems, and, more particularly, to such systems of the degenerative type, and methods of operating such systems.

When it is desired to selectively amplify frequencies above 5000 cycles, it is common to obtain selectivity by incorporating a parallel inductance-capacitance network in the plate circuit of an amplifying tube. While this technique is satisfactory for high-frequency operation, and while the inductance-capacitance (LC) network can be tuned whereby it is resonant at the selective frequency, in low frequency design, the provision of an LC network in the plate circuit is unsatisfactory.

The resonant frequency of the LC networks, as is generally known, is given by the formula:

$$f_o=\frac{1}{2\pi\sqrt{LC}}$$

If such formula is algebraically manipulated by standard technique the value of LC is given by the formula $$LC=\frac{1}{4\pi^2 f_o^2}$$

If $f_o$ is of the order of 90 cycles per second, for example, then $$LC=\frac{1}{4\times 9.85\times 8100}\simeq\frac{1}{300,000}=3\times 10^{-6}$$

If the largest inexpensive commercially-available condensers (C) having a value of the order of $1\times 10^{-6}$ farads are used in the frequency selective network, then the inductance (L) must be of the order of 3 henrys. Inductances which are stable with varying amplitudes are generally not available in magnitudes above $50\times 10^{-3}$ henrys. Moreover, notwithstanding the fact that it may be possible to construct a 3-henry inductance required for selective operation, if the same is constructed by known techniques, then the inductance varies in value depending on the amplitude of the signal passing thereto. Accordingly, the resonant frequency of the LC network shifts with amplitude and the operation of the circuit is not stable. Thus, LC systems are not satisfactory at low $f_o$'s. It will be apparent to those of ordinary skill in the art that while 90 cycles per second has been chosen as the exemplary frequency to present the problems encountered at low frequency with LC plate circuit networks, if lower frequencies are to be selectively amplified, the problem is even worse. In order to overcome such problems encountered when low frequency selective amplifying is to be performed, various suggestions have been made in the prior art. Generally, these suggestions center about two basic types of low frequency selective amplifiers heretofore existing.

One type of basic amplifier used for low frequency selective operation is generally referred to as a "frequency selective amplifier employing cathode follower." An example of such a circuit and an explanation thereof is set forth in a volume entitled, Vacuum Tube Amplifiers, Radiation Laboratories Series, McGraw-Hill, vol. 18, p. 401. The other basic type of circuit which has been used for the operation in question is also set forth in the same volume on page 402, and this other type of circuit is generally referred to as a "cascode amplifier." A frequency selective amplifier employing a cathode follower incorporates a feed-back network which passes all frequencies except the one selected back to the input stage of the system, whereby such signals serve to destroy like signals applied to the input of the system. Generally, the feedback is applied to the grid of the input tube, and the input signal is applied between the cathode and ground of the input tube whereby the input tube serves effectively as a mixer. More specifically, the input tube mixes the input signal applied between the cathode and the ground with the signal which is passed through the input tube and fed back through the filter network that passes all frequencies except the one selected. While in theory of operation, the frequency selective amplifier employing a cathode follower is satisfactory, in practice, several problems are encountered therewith. The impedance which the input tube offers the signal source (the cathode follower in this case) is variable since the feed-back varies the impedance of the input tube which the signal source faces. For this reason, it is necessary to provide a very low impedance source so that the variation in impedance of the input tube which the source faces has a minimum effect or minimum loading of the signal source. This problem of input impedance in circuits of the type presently under consideration has been previously considered. See, for example, R. D. Blackman, "Effect of Feed Back on Impedance," Bell System Technical Journal, volume XXII, No. 3, October 1943, page 269. In addition to the impedance problem encountered with the frequency selective amplifier employing a cathode follower, and as a result thereof, the selectivity curve of the circuit is broadened at its peak. In particular, because of the loading caused by the variable impedance offered by the first tube to the source, as the selectivity curve approaches its peak, the loading causes the curve to "flatten out" in the region of the peak.

The second type of circuit which has been used for low frequency operation, namely, the "cascode" amplifier, although on paper not subject to any of the difficulties encountered with the first type of circuit, in practice is almost impossible, if not impossible, to build with satisfactory operating characteristics. In the cascode type of low frequency selective amplifier, the selective feedback network includes a vacuum tube. Vacuum tubes are inherently unstable in characteristic: the heating of the tube has some effect; stray frequencies affect operation also; and various other factors depending on the particular system and its use enter into operation. Because of these inherent vacuum tube problems, and because the feedback network of the "cascode" type system incorporates a tube, the selectivity of the circuit cannot be maintained fixed over extended periods of operating time, or in certain instances from use to use.

The present invention is directed to providing a frequency selective degenerative amplifier having improved low frequency selectivity and which is not subject to the serious disadvantages of prior systems used for similar purposes. Accordingly, one of the primary objects of the present invention is to provide an improved method of amplifying a selected frequency in a signal comprising a plurality of frequencies. Another primary object of this invention is to provide a frequency selective degenerative amplifier incorporating a minimum number of parts, capable of being assembled from known components, having an improved selectivity curve, and not being seriously affected by loading of the signal source.

Basically, and in its simplest aspects, one of the embodiments of the invention provides a frequency selective degenerative amplifier comprising at least one electronic amplifying valve, having at least an anode, a cathode and a control grid; resistance means coupled between the anode and a supply voltage; impedance means coupled between the anode and electronic ground for providing a low A.C. impedance output path for signals amplified by the valve and a high impedance load for the valve; and filter means having a first input connection coupled to the output path and an output connection coupled to the grid of the amplifying valve. The filter means includes means coupled between the first input connection and the output connection for passing substantially all but essentially only one frequency, a second input connection coupled to the signal source, and means coupled between the second input connection and the output connection for passing substantially or essentially only one selected frequency. In the system of the invention, the frequencies passed by the filter means which are being "fed back" serve to destroy equivalent frequencies in the input signal. At the same time, with the system of the invention, the "unwanted" frequencies in the incoming signal are at least substantially eliminated initially. Thus, with the invention, not only is there an elimination of the unwanted frequencies initially, but, in addition, should any unwanted frequencies get through the system, means are provided for destroying such frequences.

Another embodiment of the invention provides a method of amplifying a selected frequency in a signal comprising a plurality of frequencies. This method embodiment is best understood when consideration is given to the apparatus provided by the invention for carrying out the method. Accordingly, in the following detailed description of the illustrative embodiments of the invention, attention is first directed to such apparatus. In the annexed drawings, to which the description refers:

FIGURE 1 is a schematic diagram of the basic circuit provided by the invention;

FIGURE 1*a* is a schematic diagram of the preferred form of filter means provided in the circuit of FIGURE 1;

Figure 1:
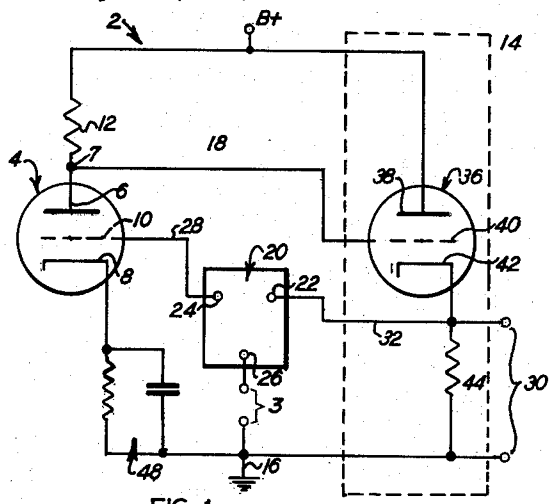

The frequency selective degenerative amplifier shown in FIGURE 1, and provided as the preferred form of apparatus to carry out the method of the invention, is generally designated by the numeral 2. Such amplifier, as suggested above, includes at least one electronic amplifying valve, shown as comprising a triode designated by the numeral 4 having an anode 6, a cathode 8, and a control grid 10.

The anode 6 of the valve 4 is, in accordance with standard practice, coupled with a supply voltage designated as B+ by a suitable plate resistor 12. Impedance means generally designated by numeral 14 and contained in a box shown in phantom in FIGURE 1 are provided in the circuit. The impedance means 14 is coupled between the anode 6 and electrical ground 16 and as explained in more detail hereinafter, serves to provide a low A.C. impedance output path for signals amplified by the valve and a high impedance load for the valve 4. In the circuit shown in FIGURE 1, the lead 18 serves to provide the coupling between the impedance means and the anode 6.

A filter means generally designated by the numeral 20 is also provided in the circuit. Such filter means has a first input connection 22, a second input connection 26, and an output connection 24. Coupled between the first input connection 22 and the output connection 24 of the filter means is a network means, explained in more detail hereinafter, for passing substantially all but substantially only the one frequency selected. Coupled between the second input connection 26 and the output connection 24 is a network means for passing substantially only the one frequency selected.

Throughout the several figures of the drawings, the numeral 3 has been used to designate an input signal source having an output impedance or resistor across which the input signal to the circuits of the invention appears.

To facilitate an understanding of the invention, let it be assumed that the selected frequency is $f_o$ and that the input signal fed to the system between the second input terminal 26 and electrical ground comprises, for simplicity, sinusoidal signals having frequencies of $f_o$, $f_o/100$, and 100 $f_o$. The input signal which is assumed to have these three superimposed frequencies passes into the filter means generally designated by the numeral 20 and such filter system passes to the grid 10 of valve 4 via the line 28, a signal consisting of, in this example, $f_o$ having its input amplitude, and $f_o/100$ and 100 $f_o$ having a fraction of their respective input amplitudes, assumed for purposes of this explanation to be $\frac{1}{100}(f_o/100)$ and $\frac{1}{100}(100f_o)$. In theory, the filter network should eliminate all frequencies except $f_o$; however, in practice this is impossible to achieve, and the filter network serves to only substantially cut down the amplitude of frequencies other than $f_o$. Therefore, the signal which is applied to the grid 10 via the line 28 consists of, in this example, three different frequencies. This signal is amplified by the valve 4 which is connected for normal amplifying operation, and as a result appears at point 7, the anode connection. The amplified signal appearing at point 7 is fed through the impedance means 14, explained in more detail below, and, as a result, such signal appears across an output path generally designated by the numeral 30. This output path is coupled by a suitable lead 32 as shown, with the first input terminal 22 of the filter means-feedback network 20. The filter means, as explained, passes all frequencies fed into the first input 22 to the output 24, except for the one frequency selected, namely, $f_o$. By virtue of the phase shift inherent in the first amplifying valve 4, the signal passing back through the feedback network via line 32 is 180° out of phase with the base input signal applied to grid 10 from which the signal passing back was formed. The input signal to the system which is applied between the second input connection 26 and ground is in phase at grid 10 with the base signal that was initially fed from such input points via line 28 to such grid. Accordingly, the signal passing back through the line 32, being 180° out of phase with the new input signal, serves to cancel or destroy components of the new input signal applied to grid 10 which correspond in frequency with components being fed back through the line 32.

While I have used the numeral 14 to generally designate an impedance means coupled between the anode and electrical ground for providing a low A.C. impedance output path for signals amplified by the valve and a high impedance load for the valve, and while any suitable means may be used to serve such function, the means provided in accordance with preferred embodiments of the invention comprises an additional electronic valve 36 which is connected for "cathode follower" operation. The second electronic valve 36, as shown, includes a second anode 38, a second control grid 40, and a second cathode 42. The second anode 38 is coupled with the power supply generally designated as B+, and, of course, suitable resistors can be provided in the coupling, if desired. The second control grid 40 is coupled with the anode 6 of the first valve 4, as shown directly; however, it is to be understood that in order to provide proper bias, a resistance-capacitance network may be incorporated. The cathode 42 of the second valve 36 is coupled to electrical ground 16 via a resistance 44 which serves to define the output path 30 hereinabove referred to.

For purposes of completeness, I have shown an R.C. bias network generally designated by the numeral 48 which maintains the cathode 8 of the first valve 4 at a suitable operating potential; however, any suitable bias means can be used here, as well as in connection with other components of the system.

Having explained the general construction of a circuit assembled in accordance with the preferred embodiment of the invention, attention will now be directed to the operating characteristics of such circuit at "high" and "low" frequency. The term "high frequency" as used herein refers to a frequency at least 2 octaves above the selected frequency $f_o$. For example, if the selected frequency $f_o$ is equal to two cycles per second, then high frequency, as used herein, would be frequencies above 8 cycles per second. Similarly, the term "low frequency" as used herein, refers to frequencies at least 2 octaves below the selected frequency. In this illustration, low frequency would mean frequencies below ½ cycle per second.

Figure 1A:
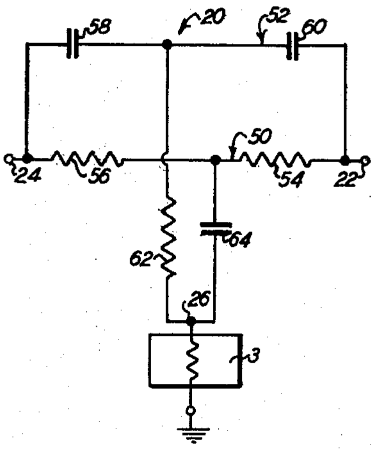

By referring to FIGURE 1*a*, it will be seen that the preferred form of filter means 20 comprises what is commonly referred to as a "twin T" filter network. Such network generally consists of at least 3 capacitance means, and at least 3 resistance means. While any number of resistors may be employed in each resistance means, and while any number of capacitors may be employed in any capacitance means, for purposes of simplicity, I have designated each means as comprising but one component.

Coupled between the first input terminal 22 and the output terminal 24 are two series branches generally designated by the numerals 50 and 52. The first series branch comprises two resistance means designated by numerals 54 and 56. The second series branch 52 comprises two capacitance means designated by the numerals 58 and 60. Coupled between the second input to the filter means, namely, the input connection 26, and the junction between the capacitors 58 and 60, is a resistance 62. Coupled between the second input connection 26 and the junction between the resistors 54 and 56 is a capacitance 64. While the values of the capacitances and the resistances in the filter means may be varied, as desired, I have found that particularly satisfactory results can be obtained when the capacitors 58 and 60 have substantially equal values; when resistors 54 and 56 have substantially equal values; when the resistor 62 has a value equal to approximately one-half the value of resistors 54 or 56; and when capacitor 64 has a value equal to approximately twice that of capacitors 58 or 60.

The circuit shown in FIGURE 1*a* passes substantially only the selected frequency from the second input connection 26 to the output connection 24. Of course, some stray frequencies, as explained above, inherently pass through the system, but the same effectively eliminates the substantial portion of such stray frequencies. The circuit also passes all frequencies except for the selected frequency, between the first input terminal 22 and the output terminal 24.

Circuits of the type shown in FIGURE 1*a* have known operating characteristics when used for selectively passing certain frequencies between the input terminal 22 and the output terminal 24. This operation of passing signals between input connection 22 and output connection 24 is explained in U.S. Patent No. 2,106,785, issued February 1, 1938 to Augustadt. The present invention not only utilizes the previously-known operation, but in addition provides for applying an additional signal thereto. The additional signal is applied at the point referred to hereinabove as input connection 26.

Figures 2, 2A:
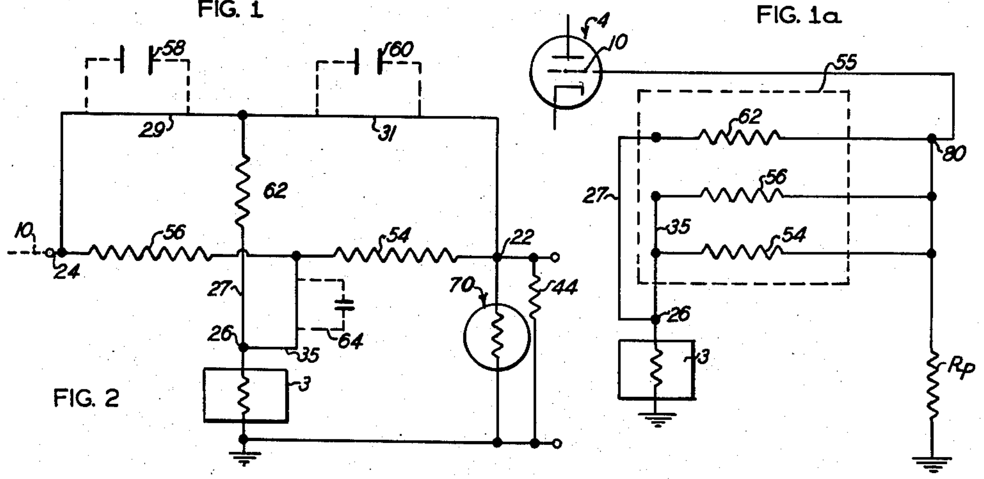
FIGURE 2 is a schematic representation of the equivalent circuit of FIGURE 1*a* when "high" frequencies are passing therethrough, FIGURE 2*a* presenting same in simplified form.
Figure 3:
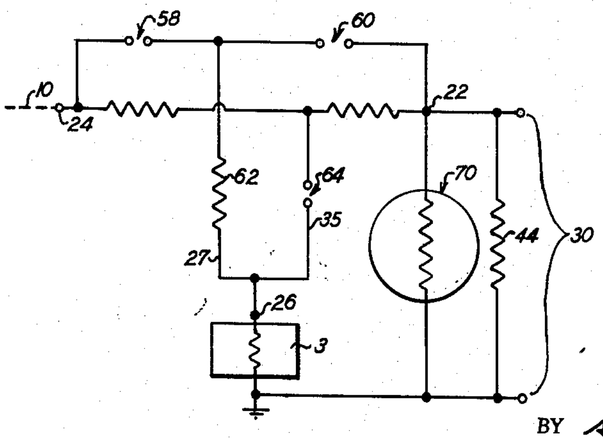
FIGURE 3 is a schematic representation of a circuit equivalent to FIGURE 1*a* when "low" frequencies are passing therethrough.

In order to facilitate comprehension of operation of the circuit when a signal is applied thereto at the first input terminal 26, attention is directed to FIGURES 2 and 3 wherein the "high frequency" and "low frequency" operation of the circuit are considered.

In FIGURE 2 the equivalent of the circuit of FIGURE 1*a* is presented when the same is considered as handling only high frequencies. By referring to FIGURE 2 it will be noted that the capacitors 58, 60 and 64 have been shown as short circuited. At high frequencies, the impedance offered to signals by these capacitors is so low with respect to the resistors that such impedance can be ignored for practical purposes, and the circuit can be considered as comprising only resistance components. As will be appreciated by those in the art, at infinity, the capacitors are essentially a short circuit; however, their impedance curve varies inversely as frequency, and thus when a signal having a frequency of two octaves or more above the selected frequency is passed through the system, the impedance values of the capacitors are negligible.

In the circuit of FIGURE 2, the second valve 36 is not shown, and a resistance designated by the numeral 70 is shown in parallel with the resistance 44 of the circuit of FIGURE 1*a*. This resistance 70 is the output impedance of the valve 36 which is connected for cathode follower operation. The resistance 70, as should be apparent by virtue of the fact that a cathode follower is used, is a substantially low impedance as compared with the actual value of the resistance 44 coupled in the cathode circuit of the valve 36.

Now, attention can be directed to what is believed to happen to a signal fed into the second input terminal 26 of the filtering means. The circuit described herein has been found to be operative, and I do not wish to be limited to the following explanation; however, to the best of my knowledge the same presents the true operating conditions in a circuit. A high frequency signal fed into the second input terminal 26 can pass therefrom through either the lead 27 or the lead 35. If such signal attempts to pass through the lead 27, then it is fed through a resistance 62 and via the line 31, assumed to short circuit capacitor 60, to the parallel combination of impedance 70 and resistance 44. Although resistance 62 is coupled with grid 10 by line 29 assumed to short circuit capacitor 58, the voltage dividing action of the network, as explained below, eliminates any effective part of the signal reaching grid 10. Alternatively, a signal fed into the point 26 can pass via the lead 35 which is shown as short circuiting capacitor 64 to the resistances 54 and 56, then to the parallel combination of resistance 44 and impedance 70.

FIGURE 2*a* is a simplified circuit which is the equivalent of the circuit of FIGURE 2 explained above, and by referring to FIGURE 2*a* it will be noted that any signal leaving the input 26 will pass through either the parallel combination of resistances 56 and 54 or through resistance 62. If, for example, resistances 54 and 56 have a value equal to twice the value of resistance 62, then the overall resistance of the parallel network designated by numeral 55 will be $R/4$, where R equals the value of resistance 54 or resistance 56.

Although, at first blush, it would seem that the signal leaving the parallel network 55 and appearing at point 80 is fed to the grid 10 of the first valve, and that the same is amplified therein, it should be noted that the resistance R is of substantial magnitude, say of the order of 1 megohm. Thus, $R/4$ is of the order of 250,000 ohms. Resistance $R_p$ (resistance of the parallel network consisting of resistances 40 and 44), however, is extremely small, say of the order of 1 to 500 ohms. Thus, the signal at point 80 is minute, and effectively no signal at all. Almost all of the voltage drop is across the network 55 and all of the signal is "used up" in such network.

From the foregoing discussion, it should be apparent that at high frequencies the circuit of FIGURE 1*a* provides substantially no output signal to be applied to the grid 10 of the first valve 4, resulting from a high frequency input signal applied to the input connection 26. Now, attention can be directed to the operation of such circuit at low frequencies.

In FIGURE 3 like numerals are used to designate corresponding components of the circuit shown in FIGURES 1 and 2. A signal appearing at the second input terminal 26 can take two paths, namely, as in the case of FIGURE 2, a path starting through the line 27 or a path starting through the line 35. If the signal attempts to pass through the line 35, it immediately faces an opening in the circuit which is formed by the capacitor 64. Actually, the capacitors in the circuit only present a broken circuit when a D.C. signal is applied at the terminal 26; however, for practical purposes, the circuit is open as far as the capacitors are concerned when the frequency is low, namely, of a value of two octaves or more below the selected frequency. Thus, any signal which attempts to pass through the lead 35 is stopped almost immediately. A signal attempting to traverse the lead 27 passes through the resistor 62 but then meets an opening in the circuit formed by the capacitor 58 or capacitor 60. Thus, at low frequencies, there is effectively no path which an input signal can take to leave the second input terminal 26 and appear at the input connection 24 or grid 10 of the first tube.

From the foregoing discussion with regard to FIGURES 2 and 3, it should be understood that in the system of the invention, when "high frequencies" are applied at the second input terminal 26, effectively no signal resulting therefrom is applied to the grid 10 of the first valve because of the voltage dividing action of the resistors in the filter network. Similarly, when low frequencies are applied to the filter network input connection 26, then no signal corresponding thereto is applied to the grid 10 of the valve 4 because the signal is effectively blocked from reaching such grid by virtue of the "open circuit effect" of the capacitors in the filter network.

When the value of the incoming frequencies are somewhere between the low frequency extreme and the high frequency extreme, then at least some effective input signal is passed between the second input connection 26 and the output connection 24 and on to the grid 10 of the first valve. As the frequency approaches the selected frequency, the magnitude of the signal appearing on the grid 10 increases.

It will be remembered that the filter network shown and described in connection with FIGURE 1*a* serves to pass between the first input connection 22 and the output connection 24 all frequencies except the selected frequency, or essentially all frequencies except the selected frequency. Thus, the portion of the filter means coupled between the first input connection 22 and the output connection 24 serves as a means for passing substantially all frequencies but effectively only one frequency, and the portion of the filter means coupled between the second input connection 26 and the output connection 24 serves as a means for passing substantially only the one frequency. The signals passing from the first input connection 22 to the output connection 24 are 180° out of phase with such signals as they appeared when initially applied to the output connection 24, and are, accordingly, 180° out of phase with new input signals which have passed from input connection 26 through the filter means and to the output connection 24. Accordingly, frequency components of signals passing back through the system from the first input connection 22 serve to destroy corresponding frequency components of new input signals being fed into the system via input connection 26, all outside tube or valve 4.

The selected frequency does not effectively pass back through the filter means, and thus the selected frequency component of new input signals is not destroyed by the feedback.

Figure 4:
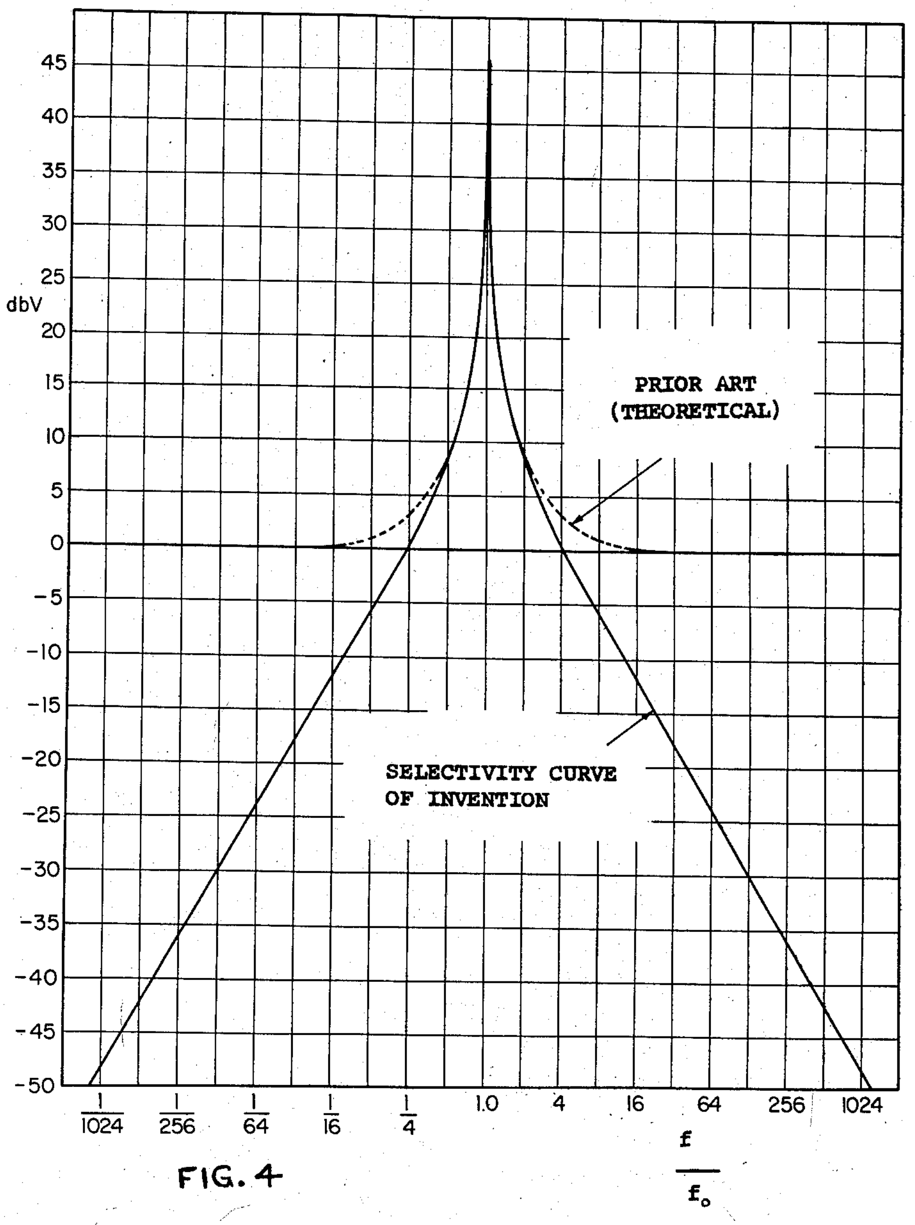
FIGURE 4 is a graphic representation showing the selectivity curve of a system constructed in accordance with the present invention and also the selectivity curve of a prior art system.

In FIGURE 4, there is graphically presented a theoretical plot of the frequency ratio versus db voltage gain for a system having an overall theoretical gain calculated to be equal to 200. By examining the graphical representation, it will be noted that at frequency $f_0$, i.e., where $f/f_0=1$, the maximum db voltage gain is achieved, and that the curve assumes a sharp peak shape at such frequency. (When the overall voltage gain of the system is 1, the db voltage gain is 0.)

It should be apparent from the graph of FIGURE 4 that the overall voltage gain of the system varies from below 1 to a value substantially above 1. This is in contrast to the operating characteristics of prior usable low frequency selective amplifiers. For comparison a theoretical curve for a prior art type low frequency degenerative amplifier is presented in phantom in FIGURE 4. Although the comparison curve is presented as sharply peaked, it is to be understood that such peak cannot be obtained in practice. It will be noted that the phantom curve levels off at a db voltage gain of 0 or a system gain of 1 and does not go below such value. Thus, for frequencies which are "high" and for frequencies which are "low," the prior art systems provided a voltage gain of 1. In contrast, the system of the present invention provides essentially no voltage gain for the "high frequencies" or for the "low frequencies." The system of the invention is thus a substantial improvement "selectivity-wise."

Figure 5:
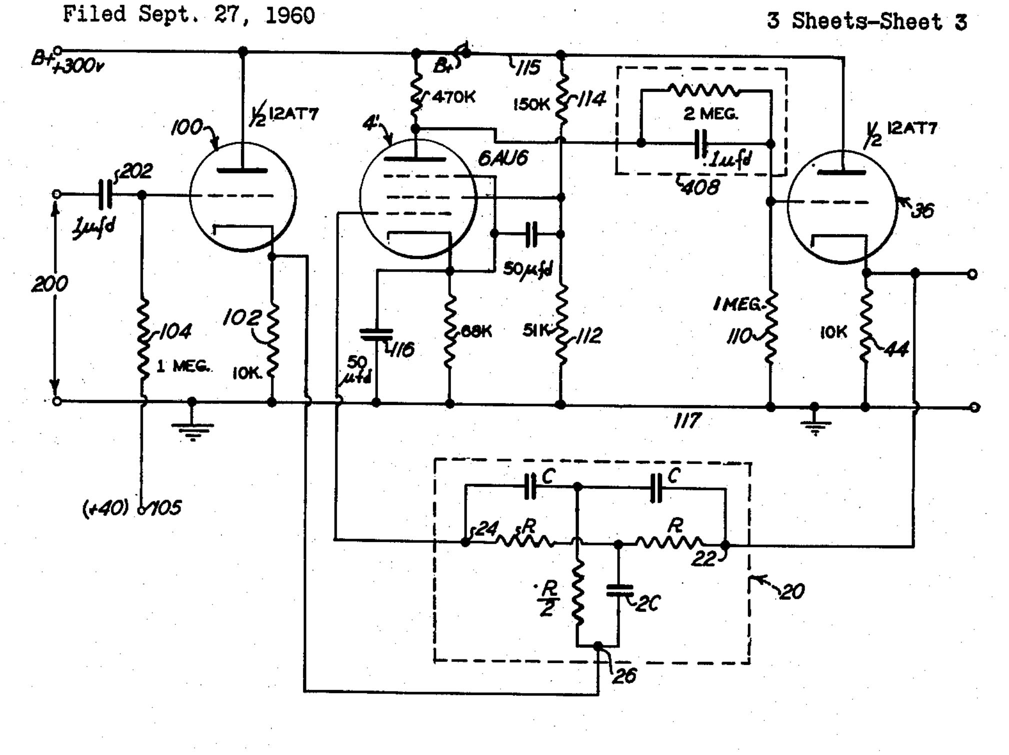
FIGURE 5 is a schematic diagram of an actual circuit constructed in accordance with the present invention and designed for use where the selected frequency is above 20 cycles per second.

A practical circuit particularly adapted for operation as a selective amplifier, and constructed in accordance with the present invention is presented in FIGURE 5. This particular circuit has been found to be satisfactory in operation when the selected frequency has a value above 20 c.p.s. In the circuit of FIGURE 5, the signal to be amplified is applied across the input 200 from which it is fed via an input capacitor 202 to the grid of a cathode follower stage 100. The output from the cathode follower stage is taken across the cathode follower resistance 102 and fed directly to the input 26 of the filter means 20. If desired, the grid bias resistor 104 of the cathode follower stage 100 can be connected to ground, or, in the alternative, I have found that more linear operation of the cathode follower can be obtained by coupling the grid bias resistor 104 with a source of positive potential, as at 105. The positive potential may be obtained by placing a voltage dividing network across the power supply used for B+.

In the circuit of FIGURE 5, the first valve 4, which is shown in FIGURE 1 as a triode, has been replaced by a pentode designated by the numeral 4'. The operation of the pentode 4' is exactly the same as the operation of the triode 4 shown in FIGURE 1; however, as is well known to those of ordinary skill in the art, more gain can be obtained with pentode operation. To provide a proper screen grid voltage for application to the screen grid of the pentode 4', there is incorporated a voltage dividing network comprising resistors 112 and 114 which extend between the B+ bus 115 and the ground bus 117. A capacitor 116 is coupled between the resistors of the voltage dividing network and the common coupling between the suppressor grid and the cathode of the pentode 4'.

In the connection between the anode of the pentode 4' and the grid of the valve 36, I provide a biasing network comprising a parallel RC combination. This network has been designated by the numeral 403.

The remaining components in the circuit of FIGURE 5 correspond exactly with the components discussed hereinabove in connection with FIGURES 1 through 3. In order to select the values for the resistance and capacitance components of the filter means 20, the first step is to decide on the selected frequency $f_0$. Once this frequency is determined, then the values of resistance and capacitance are obtained by suitable substitution in the formula:

$$f_o=\frac{1}{2\pi RC}$$

Having obtained suitable values for R and C, the values $R/2$ and 2C shown in FIGURE 5 can be obtained.

Although the circuits described hereinabove in connection with FIGURES 1–5 constitute the preferred embodiment of the present invention it has been found that the filter networks 20 of FIGURES 1–5 can be replaced by any of the filter network shown in FIGURE 6. The network of FIGURE 6(*a*) comprises a resistance 304 coupled between the first input connection 22 and the output connection 24, and a pair of capacitance means 306 and 308 coupled in series between the same connections. A resistor 302 is coupled between the second input connection 26 and the junction 310 between capacitors 306 and 308. The filter means of FIGURES 6(*a*) functions to provide exactly the same results as are obtained with the filter network for FIGURES 1–5. If the filter means of FIGURE 6(*a*) is analyzed at low frequency operation, where the capacitors present effectively an open circuit, and is also analyzed at high frequency operation where the capacitors present effectively a short circuit, then the resultant operation is substantially the same as that described hereinabove. Accordingly, it is believed unnecessary to repeat a complete analysis of high and low frequency operation of the circuit of FIGURE 6(*a*).

Figure 6A:
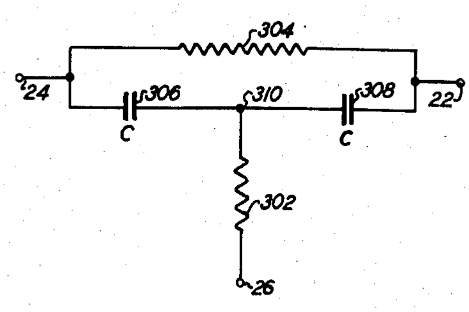
FIGURES 6*a* and 6*b* present modified forms of filter networks which can be used in amplifying circuits of the invention.
Figure 6B:
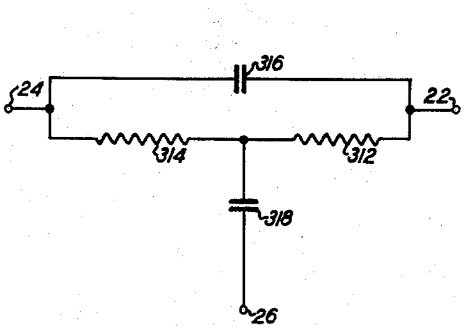

FIGURE 6(*b*) is similar to FIGURE 6(*a*), only the resistance and capacitance components have tbeen reversed. Basically the operation is the same, however. It has been found that the filter means of FIGURES 1–5 provide in normal operation a better defined selectivity curve than the circuits of FIGURE 6; however, for many applications the selectivity of the circuits of FIGURE 6 is adequate. To select components for FIGURE 6(*a*) use is made of the formula $$f_o=\frac{1}{2\pi C\sqrt{R_1R_2}}$$

wherein $R_1$=Resistance 302,
$R_2$=Resistance 304, and
$C$=Capacitance 306 or 308.

To select components for FIGURE 6(*b*) use is made of the formula $$f_o=\frac{1}{2\pi R\sqrt{C_1C_2}}$$

wherein $C_1$=Capacitance 318,
$C_2$=Capacitance 316, and
$R$=Resistance 314 or 312.

While I have described particular circuits hereinabove, it is to be understood that an important feature of the present invention is to provide a method of amplifying a selected frequency in a signal comprising a plurality of frequencies. As utilized in the apparatus described above, or in other suitable apparatus if desired, my method comprises the steps of filtering an input signal to produce a filtered signal having a selected frequency of a magnitude at least substantially equal to the magnitude of the selected frequency in the input signal and having all other frequencies of the input signal of a magnitude less than the magnitude of the other frequencies in the input signal; amplifying the filtered signal to produce an amplified signal; filtering the amplified signal to produce a feedback signal having the selected frequency eliminated therefrom; and mixing the feedback signal with the next input signal to destroy frequencies in the new input signal corresponding to frequencies in the feedback signal.

According to a modified embodiment of both the method and apparatus provided by the invention, the selected frequency is made variable. To achieve such result with the circuits presented herein, the capacitors in any of the filtering means disclosed are replaced by a gang capacitor having a common shaft rotatable to vary the values of the condensers and in turn the selected frequencies.

It is to be understood that the term "value" as used herein refers to "resistance values," and "capacitance values."

After reading the foregoing detailed description of this invention, it will be apparent that the objects set forth at the outset of this specification have been successfully achieved. Various modifications may occur to those of ordinary skill in the art, and accordingly.

What is claimed is:

1. A frequency selective degenerative amplifier system comprising the combination of one pentode having a first anode, a first cathode and a first control grid; resistance means coupled between said anode and a supply voltage; means biasing said pentode for operation free of oscillations; a first triode having a second anode, a second cathode and a second control grid, said second control grid being coupled to said first anode, said second cathode being coupled with electrical ground by an impedance means, said second anode being coupled with a supply voltage, said first triode and the impedance means coupled to the cathode thereof operating as a first cathode follower stage; said first cathode follower stage providing a low A.C. impedance output path for signals amplified by said pentode and a high impedance load for said pentode; filter means having a first input connection coupled to said output path and an output connection coupled to said first control grid, said filter means including means coupled between said first input connection and said output connection for passing substantially all but substantially only one frequency, said filter means also having a second input connection and including means coupled between said second input connection and said output connection for passing substantially only said one frequency, and a second single triode cathode follower stage forming the input network of said system, the output terminal of said second cathode follower stage being connected to said second input connection; said first cathode follower stage, said second cathode follower stage and said pentode being all adapted to all be operated from a single power supply means having only positive potential with respect to said electrical ground, said pentode comprising the only amplifying stage of said system having a gain greater than unity, said output terminal of said second cathode follower stage and said second input connection being at the same potential.

2. A frequency selective degenerative amplifier system as defined in claim 1 wherein said filter means includes two current paths between said first input connection and said output connection, one of said paths including at least one capacitance element and the other of said paths including at least one resistor element, one of said paths having at least two elements of the same type, only said path having at least two elements of the same type being coupled with said second input connection, the coupling between said path having at least two elements of the same type and said second input connection consisting of an element of the other type.

References Cited in the file of this patent

UNITED STATES PATENTS

| | | |
|---|---|---|
| 2,131,393 | Stillwell | Sept. 27, 1938 |
| 2,459,046 | Rieke | Jan. 11, 1949 |
| 2,987,678 | Miller et al. | June 6, 1961 |

OTHER REFERENCES

T. S. Gray: Applied Electronics, N. Y., John Wiley & Sons, 1954, page 434.